April 23, 1940.  A. H. ADAMS  2,198,523
INDICATOR
Filed Nov. 10, 1937  2 Sheets-Sheet 1

Inventor
A. H. Adams

By Clarence A. O'Brien
Hyman Berman
Attorneys

April 23, 1940.                A. H. ADAMS                    2,198,523
                                INDICATOR
                        Filed Nov. 10, 1937            2 Sheets-Sheet 2
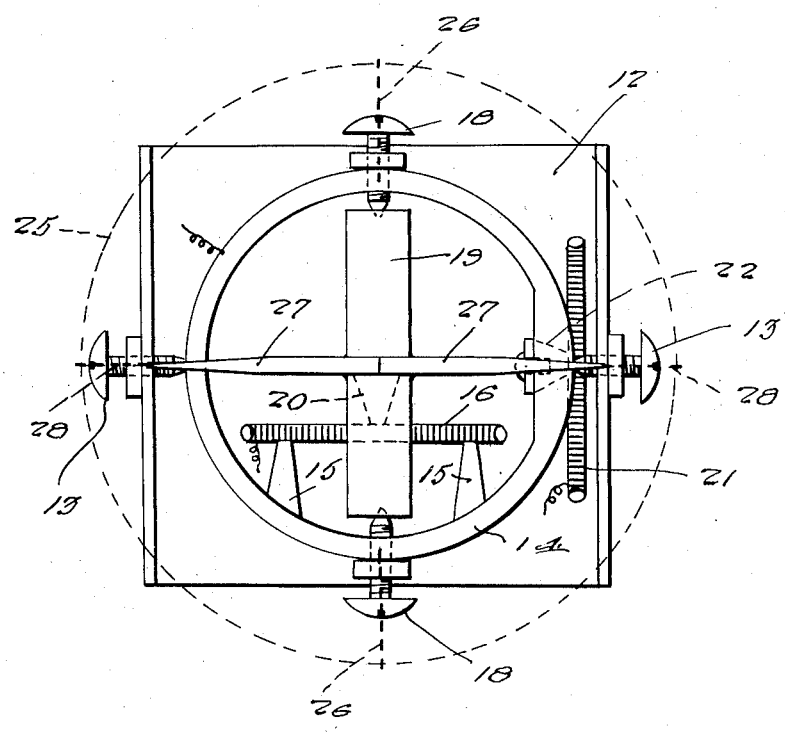
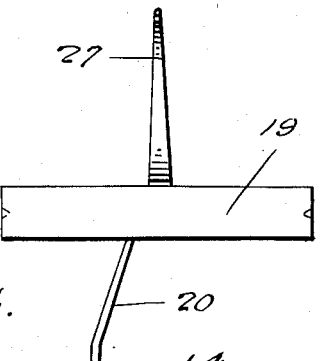
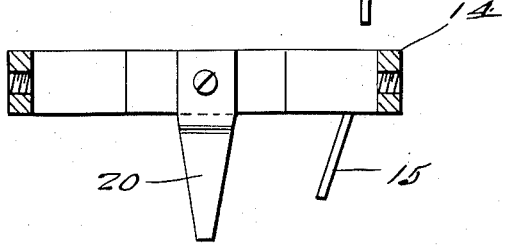
Inventor
A. H. Adams Patented Apr. 23, 1940

2,198,523

UNITED STATES PATENT OFFICE 2,198,523

INDICATOR

Alfred H. Adams, Burbank, Calif.

Application November 10, 1937, Serial No. 173,947

1 Claim. (Cl. 201—48)

This invention is an indicating device adapted to be mounted on vehicles, such as aeroplanes, automobiles, and the like, and operable to indicate to the operator or occupant of the vehicle, in the case of an automobile, the pitch of a grade or descent being negotiated by the vehicle; or in the case of an aeroplane, to indicate the angle of inclination of the aeroplane when the latter is nosed either downwardly or upwardly, and also for indicating the angular position of the aeroplane when the latter is banked either to the right or to the left; and the invention together with its objects and advantages will be best understood from a study of the following description taken in connection with the accompanying drawings wherein:

Figure 2 is a top plan view of the device.

Figure 3 is a side elevational view of a diameter bar hereinafter more fully referred to, and Figure 4 is a transverse sectional view through a gimbal ring.

Figure 1:
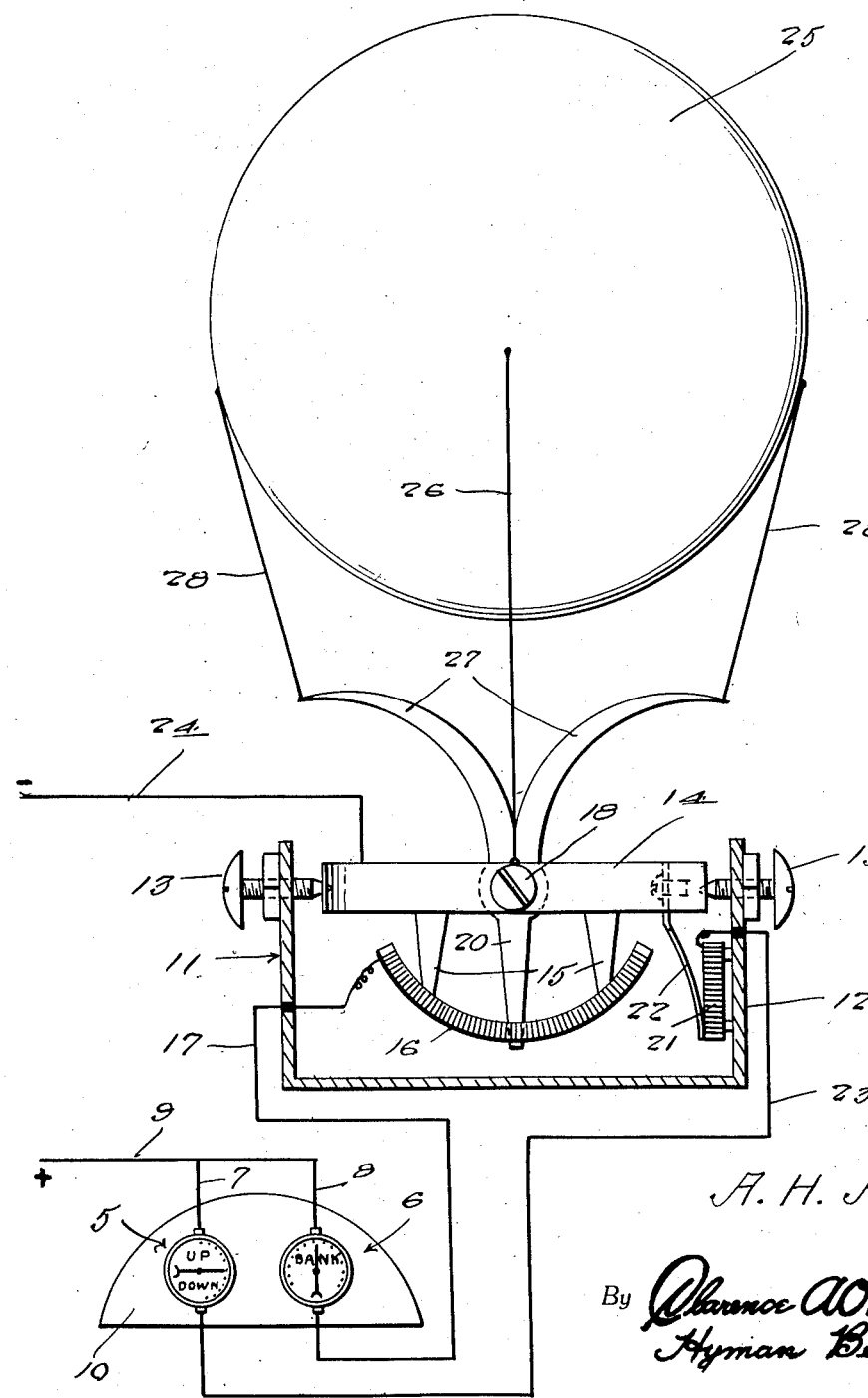
Figure 1 is a view showing somewhat diagrammatically the invention.

In accordance with the present invention it will be seen that I have illustrated the invention as equipped for mounting on an aeroplane, and to that end, the invention embodies an electrically operable grade meter or indicator 5 of any suitable and well-known construction, and a "bank" indicator or meter 6 which is also electrically operable and may be of any suitable construction.

The meters 5 and 6 are connected in circuit with one side of a source of electrical energy, as for example, a battery (not shown) through the medium of wires 7, 8 and 9.

The meters 5 and 6 are mounted on the instrument panel 10 of the aeroplane or wherever else found convenient.

For the meters 5 and 6 there is provided a control device indicated generally by the reference numeral 11. In the preferred embodiment thereof the control device comprises a supporting member 12 that is substantially U-shaped and is fixedly mounted on any fixed part of the aeroplane.

Mounted on opposite side members of the support 12 are bearing screws 13 which rotatably support therebetween a gimbal ring 14.

The gimbal ring 14 has extending downwardly therefrom bracket arms 15 which at their lower ends support a rheostat 16 that is connected through the medium of a wire 17 with one side of the "bank" meter 6.

Provided in diametrically opposite sides of the gimbal ring 14 are bearing screws 18 between which is rotatably supported a diameter bar 19. Diameter bar 19 has depending therefrom a rheostat arm 20 that has wiping engagement with the rheostat coil 16. It will thus be seen that upon relative movement between the gimbal ring 14 and the diameter bar 19 the rheostat arm 20 will move over the rheostat coil 16 in either of two directions dependent upon the direction of movement of the members 14 and 19 to control the flow of current through the meter 6 to the end that the pointer or index arm of the meter will move over the dial thereof to be read against the graduations on the dial for indicating the angle at which the machine is banked, this operation taking effect incidental to a banking of the aeroplane either to the right or left.

Fixedly mounted on the support 12 and suitably insulated therefrom is a rheostat coil 21 and suitably secured to the gimbal ring 14 at one end is a rheostat arm 22 that has a free end in wiping engagement with the rheostat coil 21. Thus it will be seen that as the support 12, in response to the nosing upwardly or downwardly of the aeroplane, moves relative to the ring 14, the rheostat elements 21, 22 will cooperate for controlling the supply of current to the meter 5 so that the index or pointer of said meter, being read against the graduations on the dial of the meter will indicate whether the aeroplane has been nosed up or down and the angle of the aeroplane when so nosed; it being noted that rheostat coil 21 is connected with one side of the meter 5 through the medium of a wire 23. Completing the electrical circuit is the ground wire 24 which leads from the negative side of the battery or other suitable source of electrical supply to the gimbal ring 14 being electrically connected to the latter in any suitable manner.

For maintaining the gimbal ring 14 and the diameter bar 19 in a substantially horizontal plane, there is provided a lighter-than-air element 25, the same being in the nature of a balloon, and at opposite sides thereof the balloon 25 is connected with diametrical opposite points of the gimbal ring 14, at opposite sides of the pivots for the gimbal ring through the medium of stay cords or the like 26.

Rising from the diameter bar 19 and curved in reverse directions relative to one another is a pair of horns 27, 27, and opposite sides of the balloon 25 are connected through the medium of stay wires 28 with the free ends of the horns 27 as shown.

Thus it will be seen that with a device such as contemplated by the present invention, mounted on an aeroplane, the electrically operable instruments 5 and 6 will be readily operated to indicate the angle of inclination of the aeroplane when the latter is being banked or being nosed either upwardly or downwardly.

It will also be understood that in actual practice, if desired, the device 11 together with the member 25 and associated parts may be enclosed in an air-tight casing, the latter containing any given amount of air pressure in order to maintain a constant air pressure around the element 25 thereby preventing any expansion or enlargement of the element 25 at high altitude where the atmospheric pressure is less than at sea level. In this connection it will be appreciated that the greater the pressure in the casing (not shown) encasing the device above referred to, the more effective will be a given size element 25. Also a dampening effect may be had by an increased pressure in such air-tight case and such a dampening effect will aid in preventing oscillation of the member 25.

It is thought that a clear understanding of the construction, utility, operation, and advantages of an invention of this character will be had without a more detailed description.

It is also to be understood that while I have herein shown and described a preferred embodiment of the invention, it is in no wise intended to limit the invention to the precise details of construction, combination and arrangement as herein illustrated; and that I accordingly claim all such forms of the invention to which I may be entitled in view of the prior art and the scope of the claim hereunto appended.

Having thus described the invention what is claimed as new is:

A control device for operating a pair of electric indicators mounted on an aeroplane, said device comprising a support adapted to be fixed to the aeroplane and to tilt therewith about rightangularly related axes, respectively, a gimbal ring pivotally mounted on the support for stabilizing against tilting from a horizontal position during tilting of the support about one axis, a diameter bar pivotally mounted on said ring for stabilizing against tilting on its pivot during tilting of the support about the other axis, a balloon operatively connected to said ring and bar and providing an operating force stabilizing the same, a rheostat comprising an arm extending from said ring and a coil fixed on said support to extend transversely of the pivotal axis of the ring, whereby under tilting of the support about said one axis said rheostat is differentially set, and a second rheostat including an arm extending from said bar and a coil mounted on said ring transversely of the pivotal axis of said bar, whereby under tilting of said support about said other axis said second rheostat is differentially set, said rheostats being adapted for connection to said indicators, respectively, to control operation of the same.

ALFRED H. ADAMS.